(12) United States Patent
Krumpholz (10) Patent No.: US 10,128,742 B2
(45) Date of Patent: Nov. 13, 2018

(54) REFERENCE SIGNAL FOR A CURRENT REGULATOR

(71) Applicant: DET International Holding Limited, Grand Cayman (KY)

(72) Inventor: Christian Krumpholz, Freiburg (DE)

(73) Assignee: DET INTERNATIONAL HOLDING LIMITED, Grand Cayman (KY)

(*) Notice: Subject to any disclaimer, the term of this patent is extended or adjusted under 35 U.S.C. 154(b) by 0 days.

(21) Appl. No.: 15/044,750

(22) Filed: Feb. 16, 2016

(65) Prior Publication Data

US 2016/0254742 A1 Sep. 1, 2016

(30) Foreign Application Priority Data

Feb. 27, 2015 (EP) .................................... 15405019

(51) Int. Cl.
*H02M 1/42* (2007.01)
*H02M 1/12* (2006.01)
(Continued)

(52) U.S. Cl.
CPC .............. *H02M 1/42* (2013.01); *H02M 1/12* (2013.01); *H02M 1/4208* (2013.01);
(Continued)

(58) Field of Classification Search
CPC .......... H02M 1/42; H02M 2001/0025; H02M 2001/0022; H02M 1/44; H02M 1/12;
(Continued)

(56) References Cited

U.S. PATENT DOCUMENTS 6,181,539 B1 1/2001 Maejima et al.
9,473,042 B1 * 10/2016 Chu ........................ H02M 7/44
(Continued)

FOREIGN PATENT DOCUMENTS

EP 2793386 A1 10/2014
JP WO 2013088714 A1 * 6/2013 .............. H02M 1/12
WO 2014/046012 A1 3/2014

OTHER PUBLICATIONS

European Search Report in EP Application 15405019.9, European Patent Office, dated Sep. 9, 2015.

*Primary Examiner* — Gustavo Rosario Benitez
(74) *Attorney, Agent, or Firm* — Robert S. Babayi; Vector IP Law Group LLC (57) ABSTRACT

A PFC circuit according to the invention is connected to a grid, includes an input filter and a rectifier connected to a converter. A control circuit generates the reference current for the current regulator of the converter that controls its input current. Thereby, the reference current is generated by adding an offset current ($I_0$) to a standard reference current and adapting the magnitude of the standard reference current to compensate for a change of the input power resulting from the addition of the offset current ($I_0$). However, due to the addition of the offset current ($I_0$) the magnitudes of some lower harmonic components of the input current of the power supply unit are increased and the magnitudes of some higher harmonic components of the input current are decreased such that the power supply may draw more current from the grid.

11 Claims, 8 Drawing Sheets

(51) Int. Cl.
*H02M 1/44* (2007.01)
*H02M 1/00* (2006.01)

(52) U.S. Cl.
CPC ....... *H02M 1/4216* (2013.01); *H02M 1/4225* (2013.01); *H02M 1/44* (2013.01); *H02M 2001/0025* (2013.01); *H02M 2001/4291* (2013.01); *Y02B 70/126* (2013.01)

(58) Field of Classification Search
CPC ............. H02M 1/4216; H02M 1/4225; H02M 1/4208; H02M 2001/4291; Y02B 70/126
See application file for complete search history.

(56) References Cited

U.S. PATENT DOCUMENTS

| | | | |
|---|---|---|---|
| 2007/0030708 A1* | 2/2007 | Wei ................... | H02M 1/12 363/44 |
| 2007/0103947 A1* | 5/2007 | Taguchi .............. | H02M 1/12 363/45 |
| 2012/0176101 A1* | 7/2012 | Skinner .............. | H02M 1/4225 323/205 |
| 2013/0033907 A1* | 2/2013 | Zhou .................. | H02M 1/12 363/37 |
| 2014/0139155 A1* | 5/2014 | Desharnais .......... | H02P 6/08 318/400.02 |
| 2015/0236606 A1* | 8/2015 | Sakakibara ......... | H02M 5/4585 363/37 |
| 2015/0263599 A1* | 9/2015 | Chen ................. | H02M 1/12 363/40 |

\* cited by examiner

REFERENCE SIGNAL FOR A CURRENT REGULATOR

TECHNICAL FIELD

The invention relates to a method for generating a reference signal for a current regulator of a PFC circuit of a power supply unit. The invention also relates to a PFC circuit including such a current regulator and a power supply unit including such a PFC circuit. Further, the invention relates to a corresponding control circuit for generating a reference signal for a current regulator of a PFC circuit of a power supply unit.

BACKGROUND ART

Electrical appliances are usually connected to a power grid to be fed with the electrical power to operate them. Often, such appliances include a power supply unit to convert the electrical power delivered by the grid into a specific form of electrical power that may be used by the appliance itself or that may be further provided to another device connected to the appliance.

In order to limit undesired feedback into the grid, such appliances usually have to fulfil some requirements regarding the current drawn from the grid. These requirements for example include limitations of the harmonic content of the current drawn by an appliance such as for example defined in the standard IEC 61000-3-2. The current drawn by power supplies such as for example switch-mode power supplies usually includes a series of harmonic components where the magnitudes of these harmonic components depend on the internal design of the power supply, in particular on the design of the power circuit. Said standard for example defines maximum values for the magnitude of each harmonic component such that these magnitudes become smaller, the higher the number of the harmonic become.

Usually a (switch mode) power supply includes a front end and a back end power stage, in particular power supplies with an input power of more than 50 W (Watt). The front end is usually a PFC (power factor correction) stage which minimizes the harmonic content of the input current of the power supply and which generates a more or less constant output voltage and the back end is usually a DC/DC convertor operating from a generally constant input voltage. The PFC stage comprises both power train and control logic. The power train for example is a boost convertor located directly after a bridge rectifier of the PFC stage. The control logic adapts the input current in such a way that it immediately follows the input voltage. This means that the input impedance of the PFC essentially is a resistor. Its resistance thereby is a function of the grid voltage and the output power of the power supply.

The above topology works perfectly for a one-phase input, where the single phase is provided between a line conductor and the neutral conductor. But for a three-phase input, for example a grid having three lines but no neutral conductor it may create too high harmonics at higher power levels. Depending on the particular application and configuration, for example depending on the capacitance downstream of the rectifier, this topology may work for example to power levels up to 500 W or even up to 1500 W because of the reduced current conduction angle. To overcome this issue, a so-called passive PFC choke could be provided downstream of the three-phase bridge rectifier or an active PFC circuit can be provided which comprises one PFC choke per phase line.

The passive PFC choke solution has however limitations regarding power loss and size whereas the other solution is suitable for higher power levels only, i. e. for power levels up to approximately 2 kW.

Another drawback of the prior art solutions is that they do not actively damp the resonance circuits that are formed by the grid impedances in conjunction with the EMI capacitors that are often provided between the phase lines and the neutral conductor of the power supplies input filter. These EMI capacitors are also designated as X-capacitors. Load variations at the output of the power supply lead to input current variations which excite such resonance circuits which may lead to undesired high input voltages that may even lead to a malfunction or destruction of the power supply.

SUMMARY OF THE INVENTION

It is therefore the object of the invention to provide a method and control circuit pertaining to the technical field initially mentioned, that enable power supplies drawing current from the grid having a reduced harmonic content and that are suitable for a wide power range.

The solution of the invention is specified by the features of claim 1. According to the invention, the reference signal $I_{ref}$ for the current regulator is generated such that a magnitude of a lower harmonic component of an input current of the power supply unit is increased and a magnitude of a higher harmonic component of the input current is decreased. Accordingly, the magnitude of at least one lower harmonic component is increased and the magnitude of at least on higher harmonic component is decreased. Preferably, the magnitude of more than one lower harmonic component is increased and the magnitude of more than one higher harmonic component is decreased. Or in other words, the power is moved from the higher to the lower harmonics.

By increasing the harmonic content of the lower harmonics and decreasing the content of the higher harmonics, a correspondingly adapted power supply not only fulfills the requirements regarding the grid distortion but also enables to draw a higher input power from the grid. This can be done without exceeding for example the limits for the harmonic contents as defined in the above mentioned IEC standard.

In a preferred embodiment of the invention, the reference signal is generated such that the magnitude of a harmonic component lower than an eleventh harmonic of the input current is increased and the magnitude of a harmonic component higher than a thirteenth harmonic of the input current is decreased. In this case, the magnitude of the eleventh and the thirteenth harmonics remain more or less constant.

However, depending for example on the application of such a current regulator, the number of the harmonic that divides the lower from the higher harmonics may be any number between 5 and 20.

The generation of the reference signal is usually based on the input voltage of the power supply unit. And since most commercial power grids do provide AC voltages having a generally sinusoidal waveform, either single or multi phase, the reference signal $I_{ref}$ is generated in a preferred embodiment of the method according to the invention, as a sinusoidal signal $I_{ref}=\hat{I}*\sin(\omega t)+I_0$ having the angular frequency u of the AC grid to which the power supply unit is connected. Generally, the value $I_0$ may either be a positive or negative value and it may be determined in different ways. It may for example be chosen to have a constant value between −1 and 1, independent of the topology and the operation parameters of the power supply unit. However, the value $I_0$ is preferably generated in dependency of the current conduction angle $\varphi_0$ which has shown to provide the best results.

In a further preferred embodiment of the invention, $I_0$ is generated as the negative value $$I_0 = -\hat{I} * \sin(\varphi_0)$$

which means that $I_0$ is a fraction of the magnitude $\hat{I}$ of the input current. Whereas a positive value $I_0$ may for example be used in connection with boost converters, a negative value $I_0$ is advantageous in applications using buck converters.

As can be seen, $I_0$ just depends on the magnitude $\hat{I}$ and the current conduction angle $\varphi_0$.

It would also be possible to determine $I_0$ in a different way, such as for example by scaling the magnitude $\hat{I}$ with any factor between 0 and 1 or by subtracting a variable of fixed amount. It would also be possible to determine $I_0$ as a multiple or a fraction of the current conduction angle $\varphi_0$ or by adding a specific value to the current conduction angle $\varphi_0$. These solutions would however reduce the power that can be drawn from the grid since less power can be moved from the higher to the lower harmonics.

$I_0$ is therefore preferably generated in dependency of the sine of the current conduction angle $\varphi_0$. Accordingly, the lower the absolute value of the current conduction angle $\varphi_0$ the smaller the value of $I_0$ becomes and the closer the current conduction angle $\varphi_0$ is to $\pi/2$, the higher $I_0$ becomes. Further it is to note that the closer the current conduction angle $\varphi_0$ is to $\pi/2$, the higher the peak current becomes and therefore the smaller the efficiency of the circuit becomes.

The reference signal $I_{ref}$ is therefore generated according to the following formula:

$$I_{ref} = \hat{I} * \sin(\overline{\omega}t) - \hat{I} * \sin(\varphi_0)$$

Except for the magnitude $\hat{I}$ the sinusoidal part $\hat{I}*\sin(\overline{\omega}t)$ of the reference signal $I_{ref}$ thereby corresponds to the reference signal as generated in a comparable prior art PFC converter and used in the prior art for regulating the input current of the PFC converter. By then adding a constant negative value $I_0$ to the reference signal, the impedance of the PFC circuit, which can be regarded as a resistor, can be considerably reduced. In the case of a three phase power supply, this results in a power supply that may draw higher input power from the grid, depending on the particular control scheme up to approximately 2 kW in a common power grid with a voltage of about 230 V (Volts) between a phase line and the neutral line, by using just a single PFC stage behind the bridge rectifier. This also saves component count and therewith reduces space requirements and costs.

In the prior art, the resistance of the PFC circuit is a function of the grid voltage and the output power of the power supply. Compared with this invention, the resistance of such a prior art PFC circuit is designated as a static resistance. Contrary to that, applying the invention results in a kind of dynamic resistance of the PFC circuit that further depends on the current conduction angle $\varphi_0$. For negative values $I_0$ this dynamic resistance is lower than the static resistance of a comparable prior art PFC circuit.

A further advantage of the invention is, that the dynamic resistance more efficiently damps the resonance circuits that are formed by the reactive elements of the grid and the EMI capacitors of the power supply.

In the case of a negative value $I_0$ the reference current becomes lower wherefore the power drawn from the grid would decrease compared with a conventional or standard PFC circuit if the magnitude $\hat{I}$ of the reference signal would be generated with the same value as in the standard PFC circuit. In order to achieve the same output power of the power supply unit, the magnitude $\hat{I}$ of the reference signal $I_{ref}$ has to be increased. In another example where the reference current is increased by adding as positive value $T_0$ the magnitude $\hat{I}$ of the reference signal $I_{ref}$ has to be decreased to draw about the same power from the grid.

In a preferred embodiment of the invention, and in order to achieve a same output power of the power supply unit using a standard reference signal $I_s = \hat{I}_s * \sin(\overline{\omega}t)$ having a standard magnitude $\hat{I}_s$, i. e. where $I_0=0$, the magnitude $\hat{I}$ of the reference signal is generated by modifying the standard magnitude $\hat{I}_s$ in dependency of a change of the output power of the power supply unit due to adding the value $I_0$ to the reference signal $I_{ref}$, in particular to compensate said change of the output power.

The magnitude $\hat{I}$ may for example be set by trial and error. However, the value of the magnitude $\hat{I}$ is preferably determined by a comparison of the power that may be drawn from the grid with a standard PFC circuit and a comparable PFC circuit according to the invention. The term comparable in this connection means that the PFC circuit of the invention differs from the standard PFC circuit just in the generation of the reference signal by adding the value $I_0$ and adapting the magnitude $\hat{I}$ of the reference signal accordingly.

In a standard PFC circuit the following applies:

$$\overline{P}_s(\varphi s1, \varphi s2) = \frac{1}{\varphi s2 - \varphi s1} \cdot \int_{\varphi s1}^{\varphi s2} \hat{U} \cdot \hat{I}_s \cdot \sin^2(\varphi) \cdot d\varphi$$

where $\hat{U}$ and $\hat{I}_s$ are the magnitudes of the grid voltage and current, $\varphi_{s1}$ and $\varphi_{s2}$ are the power transfer angles which are usually $\varphi_{s1}=0$ and $\varphi_{s2}=\pi$ and where $\overline{P}_s$ is the power drawn from the grid. By solving the integral, this power can be rewritten as:

$$\overline{P}_s(\varphi s1, \varphi s2) = \frac{\hat{U} \cdot \hat{I}_s}{2} \cdot \left[ 1 - \frac{\sin(2 \cdot \varphi s_2)}{2 \cdot (\varphi s_2 - \varphi s_1)} + \frac{\sin(2 \cdot \varphi s_1)}{2 \cdot (\varphi s_2 - \varphi s_1)} \right].$$

Generally speaking, the power transfer angles are those angles between which a current flow occurs. So the first angle, here $\varphi_{s1}$ is the angle where the current flow starts and the second angle, here $\varphi_{s2}$ is the angle where the current flow ends.

For a comparable PFC circuit according to the invention where $\varphi_0$ is the current conduction angle which is chosen such that the current $i(\varphi_0)$ at this current conduction angle is equal to 0 and where $\varphi_1$ and $\varphi_2$ defined the power transfer angles, the value $I_0$ is determined as $$I_0 = -\hat{I} \cdot \sin(\varphi_0)$$

and the power drawn from the grid can be calculated as $$\overline{P}_s(\varphi 1, \varphi 2) = \frac{1}{\varphi 2 - \varphi 1} \cdot \int_{\varphi 1}^{\varphi 2} \hat{U} \cdot \sin(\varphi) \cdot (\hat{I} \cdot \sin(\varphi) + I_0) \cdot d\varphi$$

This formula gives the power for a buck PFC where for the power transfer angles $\varphi_1$ and $\varphi_2$ applies that $\varphi_1 > 0$ and $\varphi_2 < \pi$. Again, this power can be rewritten as $$\overline{P}(\varphi 1, \varphi 2) = \frac{\hat{U} \cdot \hat{I}}{2} - \frac{\hat{U} \cdot \hat{I}}{4 \cdot (\varphi_2 - \varphi_1)} \cdot [\sin(2 \cdot \varphi_2) - \sin(2 \cdot \varphi_1)] - \frac{\hat{U} \cdot \hat{I}_0}{(\varphi_2 - \varphi_1)} \cdot [\cos(\varphi 2) - \cos(\varphi 1)].$$

In order to determine the magnitude $\hat{I}$ of the PFC circuit according to the invention, we can equalise the two power formulas for the standard PFC circuit and the improved PFC circuit as follows $$\overline{P}_s = \overline{P}$$

which results in the formula $$\hat{I} = \hat{I}s * f_{ref}$$

with $$f_{ref} = \frac{2 \cdot (\varphi_{s2} - \varphi_{s1}) - \sin(2 \cdot \varphi_{s2}) + \sin(2 \cdot \varphi_{s1})}{2 \cdot (\varphi_2 - \varphi_1) - \sin(2 \cdot \varphi_2) + \sin(2 \cdot \varphi_1) + 4 \cdot \sin(\varphi_0) \cdot \begin{bmatrix} \cos(\varphi_2) - \\ \cos(\varphi_1) \end{bmatrix}}.$$

Accordingly, in a preferred embodiment of the invention and in order to achieve a same output power of the power supply unit using a standard PFC circuit with a reference signal $Is = \hat{I}s * \sin(\overline{\omega}t)$ having a standard magnitude $\hat{I}s$ and where the value $I_0 = 0$, the magnitude $\hat{I}$ of the reference signal is generated by multiplying the standard magnitude $\hat{I}s$ with a factor $f_{ref}$ that is determined according to the formula above.

In a further preferred embodiment of the invention, the reference signal is generated based on the input voltage of the power supply unit by tapping a voltage either a) in front of a bridge rectifier of the PFC circuit
b) behind the bridge rectifier of the PFC circuit or
c) directly at an input of the power supply unit.

As the input voltage usually is sinusoidal, the reference signal is also assumed to be sinusoidal as it is derived from the input voltage. Accordingly, the reference signal may also be tapped at any other point as long as it represents the input voltage.

When generating the reference signal according to the invention, the current conduction angle $\varphi_0$ preferably is chosen to be between 0 and $\pi/2$ thereby maintaining a good power factor and low harmonic content. In a further preferred embodiment of the invention, the current conduction angle $\varphi_0$ is chosen to be between $\pi/5$ and $2\pi/5$. However, higher or lower current conduction angles $\varphi_0$ do work as well although not as good as with the preferred values. It is further to note that no optimal value for the current conduction angle $\varphi_0$ exists but that the most suitable value has to be found for each application. When choosing the current conduction angle $\varphi_0$ it is to balance the opposite effects of the system efficiency and the damping of the resonances resulting from the grid impedances and certain capacities of the power supply unit.

Due to the reduced current conduction angle $\varphi_0$, the peak input current becomes higher but the reference signal remains sinusoidally.

Further, the dynamic input resistance is typically about six to eight times lower than the static resistance of a comparable prior art PFC. The exact ratio however depends on the current conduction angle.

In another preferred embodiment, the reference signal is not determined according to the above mentioned formula throughout a whole period. It is set to zero if it would become negative. The zero crossing then defines the current conduction angle $\varphi_0$. In this way, a negative reference signal can be avoided which would lead to a decrease of the system efficiency.

In an even more preferred embodiment of the invention, the current conduction angle $\varphi_0$ is chosen such that the input current starts at zero. This helps to avoid current jumps which would lead to undesired harmonic components.

As already mentioned above, switch-mode power supplies often include input filters with EMI capacitors connected across the line (e.g. between a phase line and a neutral line) or other capacitors present downstream of the rectifier. Together with a serial inductivity of the grid, which may for example be introduced by a transformer, these EMI capacitors form a resonant circuit. Such resonant circuits may lead to undesired high input voltages in response to load variations at the input of the power supply.

In another preferred embodiment of the invention, the resulting resistance of the PFC circuit, designated above as its dynamic resistance, is used for actively damping these resonance circuits that result from the grid impedances in conjunction with either a EMI capacitor or a capacitor arranged downstream of a bridge rectifier of the PFC circuit. In this way, the grid can be damped typically around seven times better than with an equivalent static resistance of a prior art PFC circuit. Depending on where the input voltage of the power supply unit is tapped to generate the reference signal, the dynamic resistance of the PFC circuit may be used to damp different resonance circuits. If for example the input voltage is tapped downstream of the rectifier, the dynamic resistance of the PFC circuit damps the resonant circuit including a capacitance downstream of the rectifier.

Whereas such a grid damping is not required in every topology, it becomes advisable or even necessary if the grid impedance comprises a high serial inductivity such as for example introduced by a transformer.

The invention further has the advantage, that a smooth current shape can be achieved, thereby reducing the rms-current (root-mean-square—current) within the grid.

The solution of the invention regarding the control circuit is specified by the features of claim 11. According to the invention, the control circuit includes means to generate the reference signal such that a magnitude of a lower harmonic component of an input current of the power supply unit is increased and a magnitude of a higher harmonic component of the input current is decreased.

The invention is most suited for switch-mode power supply such that the control circuit is preferably adapted to generate the reference signal for a current regulator of a PFC circuit of a switch-mode power supply unit.

In a preferred embodiment, the control circuit is adapted to generate the reference signal $I_{ref}$ as outlined above, i.e. as a sinusoidal signal $I_{ref} = \hat{I} * \sin(\overline{\omega}t) + I_0$ having an angular frequency $\overline{\omega}$ of an AC grid to which the power supply unit is connected.

And in another preferred embodiment, the control circuit is adapted to generate the value $I_0$ in dependency of a sine of the current conduction angle $\varphi_0$, in particular as a negative value $I_0 = -\hat{I} * \sin(\varphi_0)$ as also described above.

Other advantageous embodiments and combinations of features come out from the detailed description below and the entirety of the claims.

BRIEF DESCRIPTION OF THE DRAWINGS

The drawings used to explain the embodiments show.

In the figures, the same components are given the same reference symbols.

PREFERRED EMBODIMENTS

Figure 1:
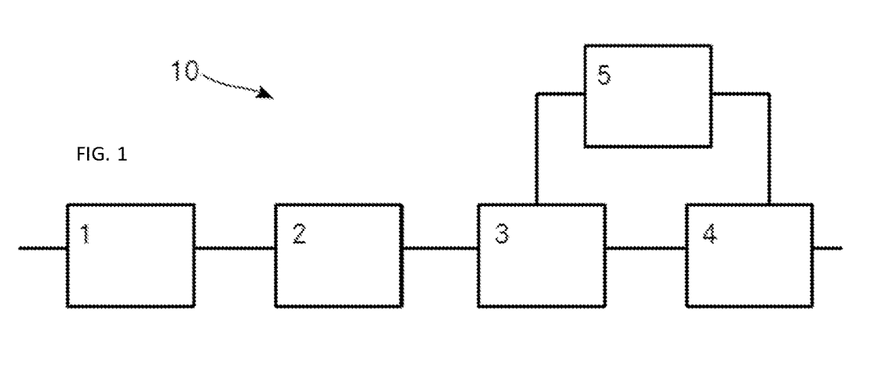
FIG. 1 a schematic depiction of a PFC circuit according to the invention.

FIG. 1 shows a schematic depiction of a PFC circuit 10 according to the invention. The first block represents the power grid 1 to which the PFC circuit 10 is connected. The second block represents the input filter 2, the third block represents the bridge rectifier 3, the fourth block represents the converter 4 and the fifth block represents the control circuit 5 that generates the reference signal for the input current of the converter 4.

Figure 2:
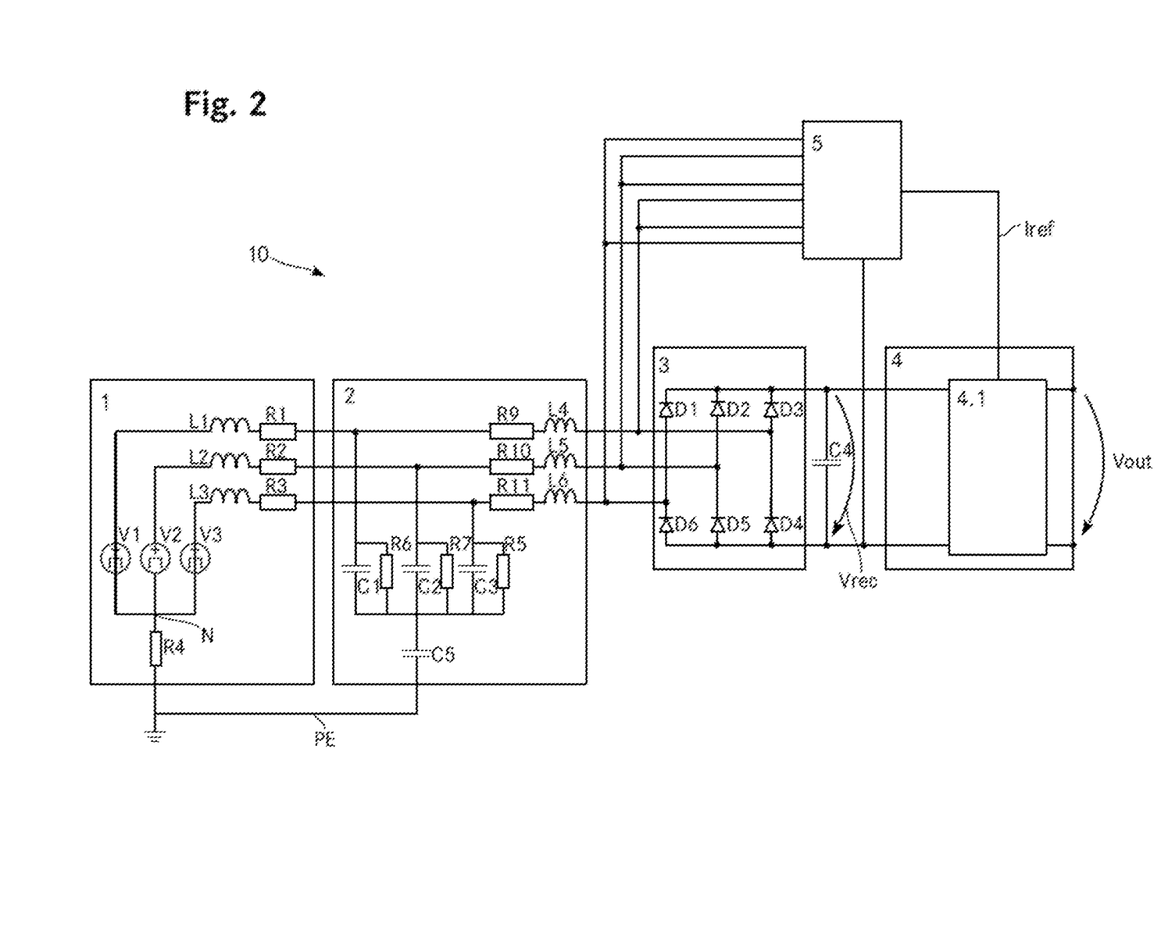
FIG. 2 a more detailed schematic depiction of a PFC circuit according to the invention, FIG. 3 a schematic depiction of the input currents of a Buck PFC connected to a two phase grid for a standard control circuit and a control circuit according to the invention with two different current conduction angles, FIG. 4 a schematic depiction of the input currents of a Buck PFC connected to a three phase grid for a standard control circuit and a control circuit according to the invention with two different current conduction angles, FIG. 5 some simulated waveforms of a standard PFC circuit, FIG. 6 a schematic depiction of a part of the spectrum of the input current of the standard PFC circuit of FIG. 5, FIG. 7 some simulated waveforms of a PFC circuit according to the invention with a current conduction angle of π/4, FIG. 8 a schematic depiction of a part of the spectrum of the input current of the standard PFC circuit of FIG. 7, FIG. 9 some simulated waveforms of a PFC circuit according to the invention with a current conduction angle of π/3, FIG. 10 a schematic depiction of a part of the spectrum of the input current of the standard PFC circuit of FIG. 9, FIG. 11 a schematic depiction of a standard PFC circuit, FIG. 12 a schematic depiction of a PFC circuit according to the invention, FIG. 13 a schematic depiction of the input resistance of a Buck PFC connected to a two phase grid for a standard control circuit and a control circuit according to the invention with two different current conduction angles, FIG. 14 a schematic depiction of the input resistance of a Buck PFC connected to a three phase grid for a standard control circuit and a control circuit according to the invention with two different current conduction angles, FIG. 15 some simulated waveforms of a another standard PFC circuit, FIG. 16 some simulated waveforms of a PFC circuit according to the invention corresponding to the standard PFC circuit of FIG. 15 but having a current conduction angle of π/4 and FIG. 17 some simulated waveforms of a PFC circuit according to the invention corresponding to the standard PFC circuit of FIG. 15 but having a current conduction angle of π/3.

FIG. 2 shows a more detailed schematic depiction of the PFC circuit 10 shown in FIG. 1. The power grid 1 has three phase lines, a neutral connector N which is optional and a protective earth line PE. The phase lines have line-to-neutral voltages V1, V2, V3 and the impedances L1, L2 and L3 as well as the resistors R1, R2, R3 represent the grid impedance.

The input from the grid 1 is fed to the input filter 2. The input filter 2 includes three X-capacitors C1, C2, C3 connected between each phase line and the protective earth line PE. Further, a Y-capacitor C5 is present within the protective earth line PE. The inductivities L4, L5, L6 represent the leakage inductivities of the common mode chokes and the resistances R9, R10, R11 represent the serial resistances of the common mode chokes.

The bridge rectifier 3 includes six diodes D1, D2, D3, D4, D5, D6 arranged in a full bridge configuration. A capacitor C4 is connected across the output of the bridge rectifier 3 for shorting the currents at the switching frequencies of the converter 4. The rectifier output, i. e. the rectified voltage $V_{rec}$ is provided across the capacitor C4. The converter 4 may include any type of convertor such as for example linear or switch-mode converters. Examples are buck converter, boost converter, inverter, flyback converter, LLC resonance converter or other converters with or without transformer. Generally spoken, the converter 4 may include any type of electronically controlled load. Accordingly, at least one control signal such as for example a PWM signal or a reference signal has to be provided to such an electronically controlled load.

The control signal therefore controls the power transfer from the input of the converter 4 to the output or vice versa.

In the example shown in FIG. 2, the converter 4 includes a switch-mode converter 4.1 which receives the rectified voltage $V_{rec}$ at its input and provides an output voltage $V_{out}$ at its output. The switches of the switch-mode converter 4.1 are controlled by a current controller that receives a reference current $I_{ref}$ as its target value for the input current of the converter 4. This reference signal is provided by the control circuit 5 which generates this reference current $I_{ref}$ according to the formula $$I_{ref} = \hat{I} * \sin(\bar{\omega}t) - \hat{I} * \sin(\varphi_0)$$

as mentioned above.

In order to generate the reference signal $I_{ref}$ according to this formula, the control circuit 5 for example includes a digital controller such as a microprocessor, preferably a digital signal processor DSP. The generation of the reference signal may however also be done by analog means which would however result in a considerably increased complexity and therewith costs of the control circuit.

Figure 3:
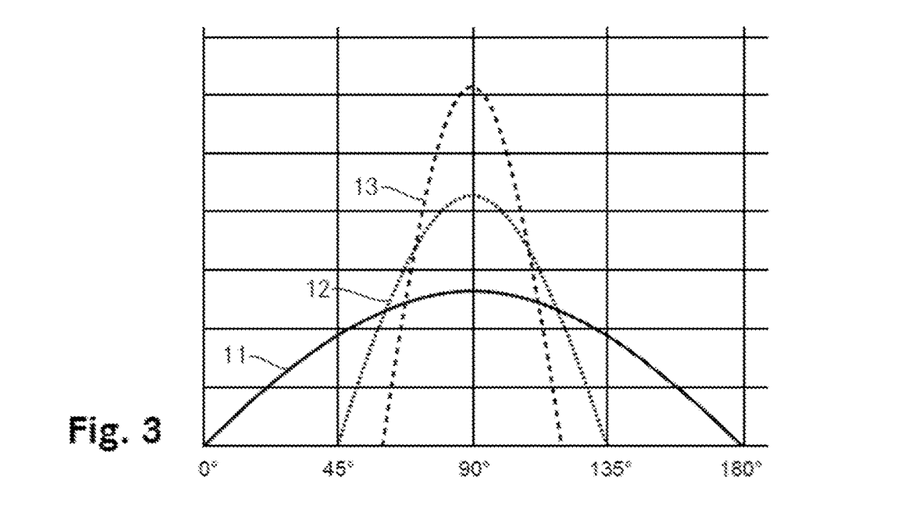

FIG. 3 shows a comparison of the input current shapes for a Buck PFC converter connected to a two phase grid in the interval between 0 (0°) and π (180°). Line 11 shows the current shape when the Buck PFC is controlled by a standard control circuit. As the Buck PFC behaves like an ohmic resistor, the current starts from zero at 0°, is sinusoidal and ends at zero at 180°. Line 12 shows the current shape for a Buck PFC that is controlled by a control circuit according to the invention with a current conduction angle of π/4. Accordingly, the sinusoidal current starts at 45° and ends at 135°. Line 13 shows the current shape for a Buck PFC that is controlled by a control circuit according to the invention with a current conduction angle of π/3. Accordingly, the sinusoidal current starts at 60° and ends at 120°.

In case of a two-phase operation where the voltage between two phases is 400 Vrms and with an input power of 1500 W the current shown in line 11 has a peak value of slightly above 12 A (Ampere). The vertical scale of the graph in FIG. 3 accordingly is two A per division.

Figure 4:
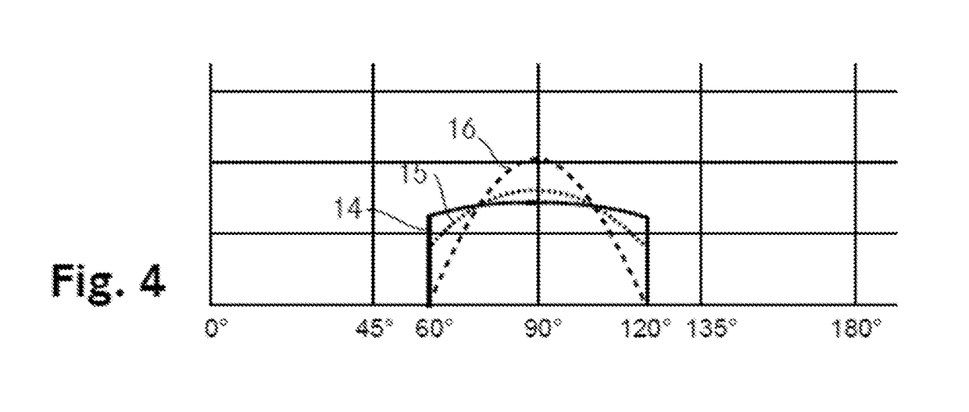

FIG. 4 shows a comparison of the input current shapes for a Buck PFC connected to a three phase grid. Line 14 shows the current shape when the Buck PFC is controlled by a standard control circuit. Line 15 shows the current shape for a Buck PFC that is controlled by a control circuit according to the invention with a current conduction angle of $\pi/4$ and line 16 shows the current shape for a Buck PFC that is controlled by a control circuit according to the invention with a current conduction angle of $\pi/3$.

As can be seen, in the three phase operation, all these currents start at 60° and end at 120° regardless of their instantaneous height. Although between 0° and 180° are three segments each having a width of 60°, the same current waveform would be repeated three times, i.e. every 60°. However, only the middle segment of the three segments is shown in FIG. 2.

Again, the vertical scale of the graph in FIG. 4 is two A per division.

Figure 5:
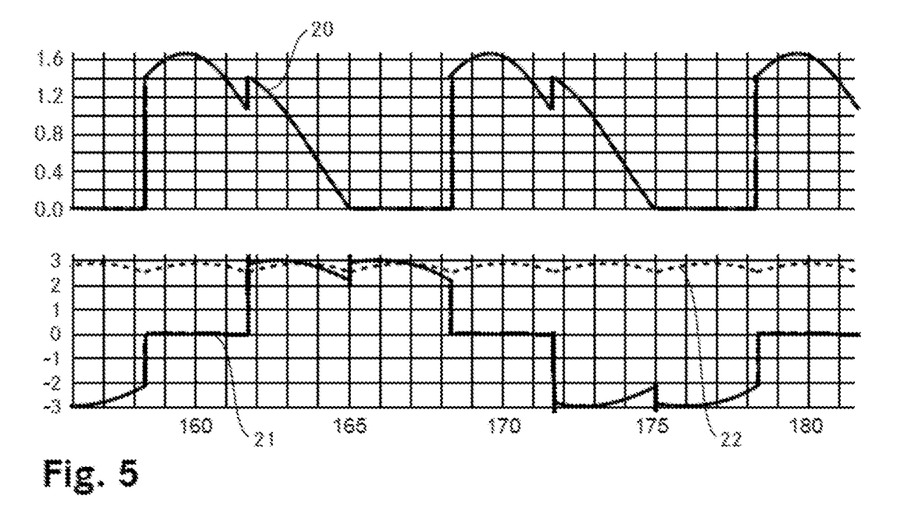

FIG. 5 shows the power and the current waveforms as the result of a simulation of a PFC circuit with a standard control circuit, i.e. where the value $I_0$ is 0 A. The grid includes three phase lines with a phase-to-phase voltage of 400 Vrms and a frequency of 50 Hz, is symmetrical and does not include a neutral line. The simulated input power is about 1500 W. In this example the standard PFC circuit can be seen as a pure resistive load with a resistance of about 195 Ohm.

For the sake of simplicity, only the power waveform 20 and the current waveform 21 of a single phase line current is shown. The power and current waveforms of the other two phase lines are identical but shifted by $\pi/3$ and $2\pi/3$ respectively. Since the horizontal scale of FIG. 5 is 5 ms (milliseconds) per division, the power and current waveforms of the other two phase lines waveforms would be shifted by 3⅓ ms. The vertical scale of the upper part of FIG. 5 with the power waveform 20 is 0.2 kW per division and the vertical scale of the lower part of FIG. 5 with the current waveform 21 is 1 A per division. As can be seen, the current waveform 21 as well as the power waveform 20 exhibit several jumps. Further, in the lower part of FIG. 5, the cumulated current waveform 22, that is the sum of the single current waveforms of all three phase lines, is shown. Its peak is about 2.9 A.

Figure 6:
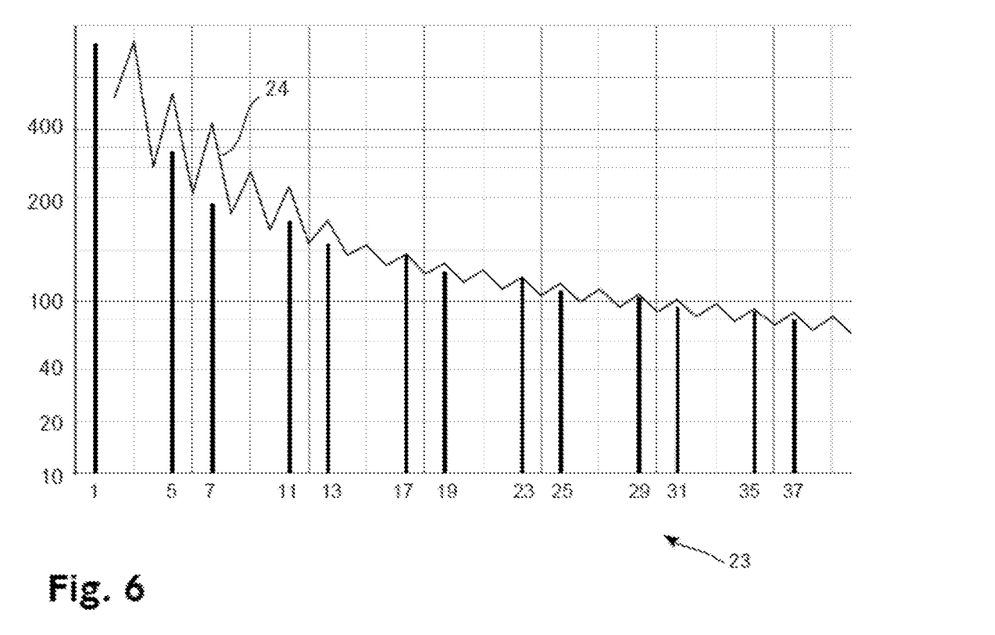

FIG. 6 shows a part of the discrete spectrum 23 of the resulting input current of the PFC circuit with the standard control circuit. On the horizontal scale the number of the harmonics is shown and on the vertical scale the harmonic content is shown in mA. Line 24 shows the limits for each harmonic according to the above mentioned IEC standard 61000-3-2 for class A devices.

As can be seen the content of the $13^{th}$ harmonic and below does not reach the respective possible maximum wherefore the harmonics as of number 17 do or almost do reach their possible maximum.

Figure 7:
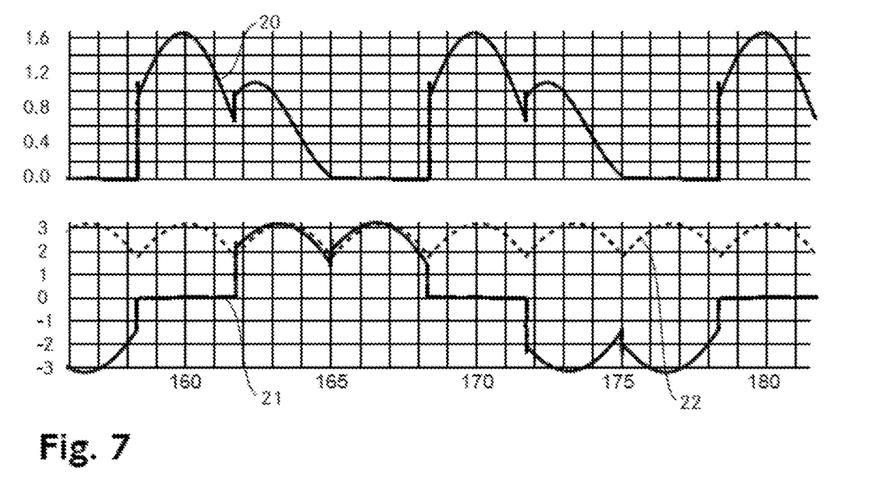

FIG. 7 shows the same simulated waveforms of a comparable PFC circuit including the invention where the current conduction angle is chosen to be $\pi/4$. The resulting value for value $I_0$ is about −7.9 A and the resistance of the PFC circuit is about 51 Ohm.

Again, only a single power waveform 20 is shown in the upper part of FIG. 7 and the current waveform 21 of a single phase line is shown in the lower part of FIG. 7. The power and current waveforms of the other two phase lines are identical but shifted by $\pi/3$ and $2\pi/3$ respectively. The vertical scale of the upper part of FIG. 7 with the power waveform 20 is 0.4 kW per division and the vertical scale of the lower part of FIG. 7 with the current waveform 21 is 1 A per division. Compared with the current and the power waveforms of the standard PFC circuit shown in FIG. 5, the jumps in both the current waveform 21 and the power waveform 20 are reduced.

Further, in the lower part of FIG. 7, the cumulated current waveform 22 is shown. Its peak is about 3.3 A.

Figure 8:
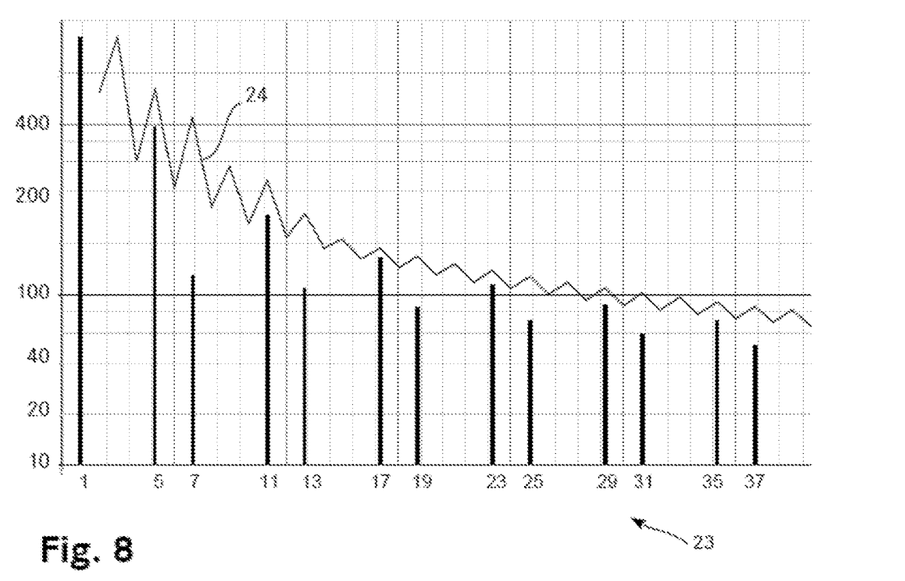

FIG. 8 again shows a part of the discrete spectrum 23 of the input current of the PFC circuit of FIG. 7. In this case, the content of the $5^{th}$ harmonic is increased and the content of the $11^{th}$ harmonic has remained unchanged. The content of the other harmonics has decreased.

FIG. 9 again shows the same simulated waveforms of a comparable PFC circuit including the invention where the current conduction angle is chosen to be $\pi/3$. The resulting value for $I_0$ is about −26.6 A and the resistance of the PFC circuit is about 18 Ohm.

Figure 9:
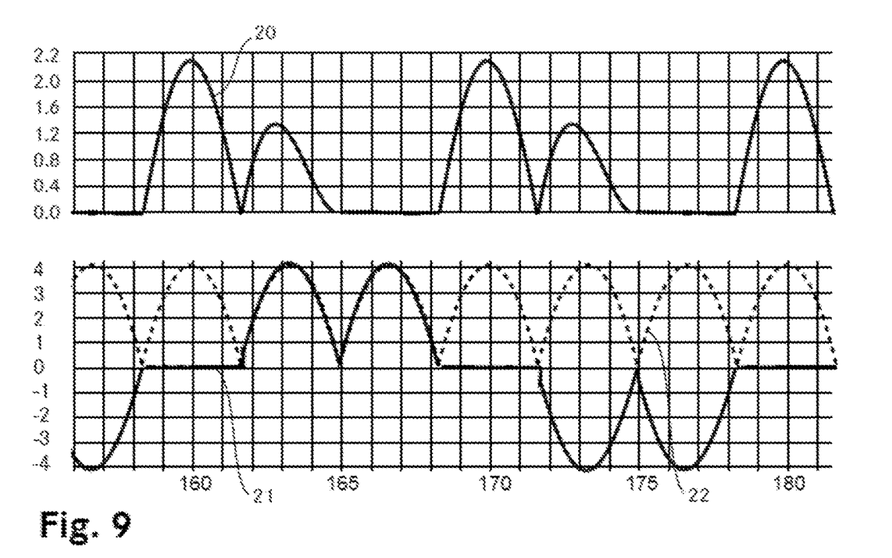

Again, only a single power waveform 20 is shown in the upper part of FIG. 9 and the current waveform 21 of a single phase line is shown in the lower part of FIG. 9. The power and current waveforms of the other two phase lines are identical but shifted by $\pi/3$ and $2\pi/3$ respectively. The vertical scale of the upper part of FIG. 9 with the power waveform 20 is 0.4 kW per division and the vertical scale of the lower part of FIG. 9 with the current waveform 21 is 1 A per division. As can be seen, the jumps in both waveforms have almost disappeared and the result are rather smooth, almost sinusoidal half-waves.

The cumulated current waveform 22 in the lower part of FIG. 9 has a peak of about 4.1 A.

Figure 10:
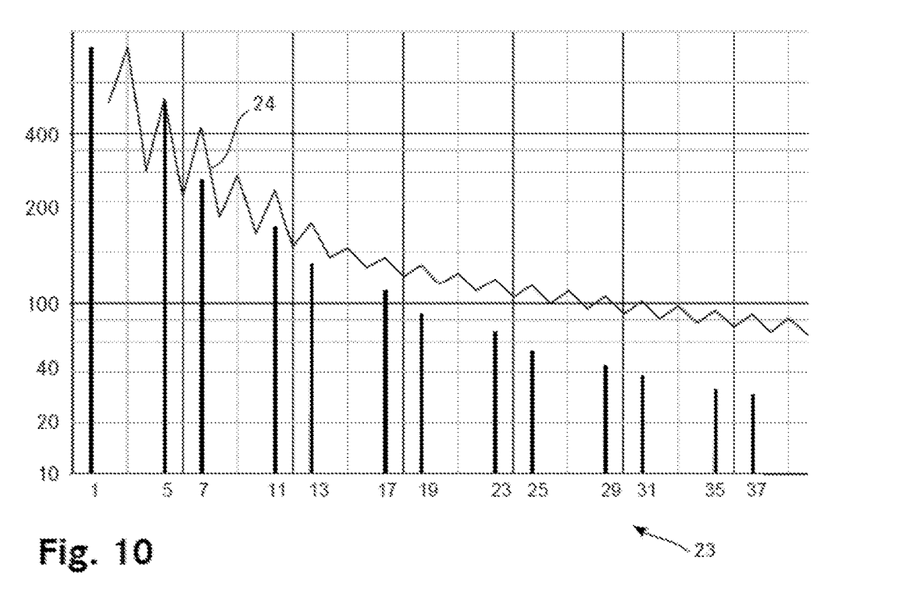

FIG. 10 again shows a part of the discrete spectrum 23 of the input current of the PFC circuit of FIG. 9. In this case, the $5^{th}$ harmonic is further increased and also the $7^{th}$ harmonic is increased compared with the spectrum for the standard PFC circuit of FIG. 5. Also in this case, the $11^{th}$ harmonic has remained unchanged. But compared with the spectrum of the standard PFC circuit, all other harmonics have been reduced.

Figure 11:
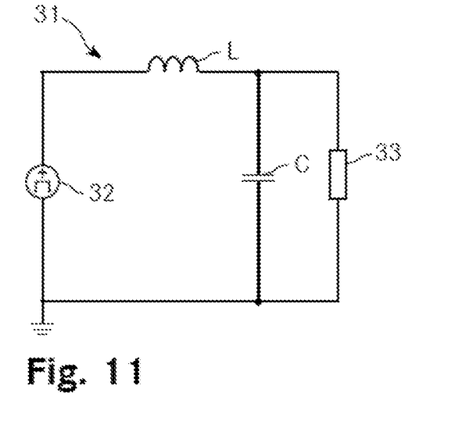

The following has been found:
- the current shaping is mainly a function of the current conduction angle
- the $11^{th}$ and the $13^{th}$ harmonics are hardly affected by this current shaping; they remain more or less constant at the same power level and input voltage; accordingly, they define the maximal power level up to this technique can be utilized
- the higher the current conduction angle is chosen (between $\pi/2$ and $\pi/4$), the higher become the higher order harmonics
- at a current conduction angle of $\pi/4$
  - the 17th harmonic is the most critical one
  - the 5th and the 7th harmonic are quite far away from their limit
- the lower the current conduction angle (between $\pi/4$ and $\pi/3$), the higher become the lower order harmonics and the lower become the higher order harmonics.
- at a current conduction angle of $\pi/3$
  - the 5th harmonic is the most critical one
  - the 17th and the 19th harmonic are quite far away from their limit
- the optimal current conduction angle for this example seems to be somewhere between $\pi/4$ and $\pi/3$, probably around $7/12\pi$; in this case, both the 5th harmonic and the 17th harmonic are very close to their limit and the maximal input power is probably between 2000 W and 2500 W FIG. 11 shows a schematic, rather simplified depiction of a standard PFC circuit 31. Usually any power line can be represented by a voltage source 32 and an impedance. In our case it is assumed that the line impedance is formed mainly by an inductivity L (e.g. by a transformer) and a parallel capacitance C. The serial resistance of the grid impedance is neglected. Any standard PFC circuit can then be replaced by a constant ohmic resistance 33. This means that the current instantly follows the voltage applied by the voltage source 32.

Figure 12:
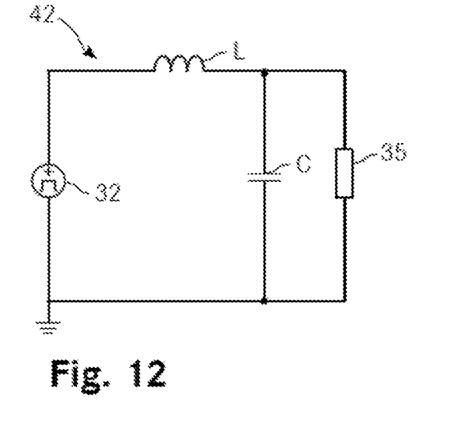

FIG. 12 shows a corresponding schematic and simplified depiction of a PFC circuit 35 according to the invention. The power line again is represented by the voltage source 32, the line impedance inductivity L and the parallel capacitance C. A PFC circuit 35 can then be replaced by a dynamic resistance 35. In this case, the current does not instantly follow the voltage applied by the voltage source 32. The resulting current follows the formula shown above where the difference is just an appropriate offset current, designated above as $I_0$.

Figure 13:
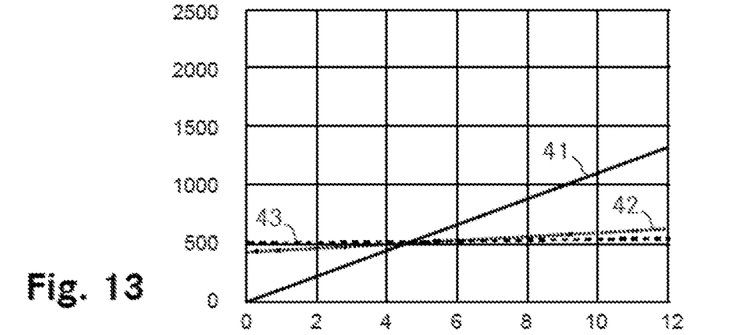

FIG. 13 shows a schematic depiction of the input resistance of a Buck PFC connected to a two phase grid for different configurations. The horizontal scale shows the input current in Ampere with a scale of 2 A per division and the vertical scale shows the input voltage in Volts with a scale of 500 V per division.

Line 41 shows the input resistance for a standard control circuit, line 42 shows the input resistance for a control circuit according to the invention with a current conduction angle of $\pi/4$ and line 43 shows the input resistance for a control circuit according to the invention with a current conduction angle of $\pi/3$.

As shown, line 41 of the input resistance of the standard PFC circuit behaves like an ohmic resistor and runs through the origin. However, lines 42 and 43 do not run through the origin but are offset such that a current flow only starts at an input voltage level of about 450 V and 500 V respectively. It can further be seen that the resistance value is considerably reduced in the PFC circuit according to the invention.

Figure 14:
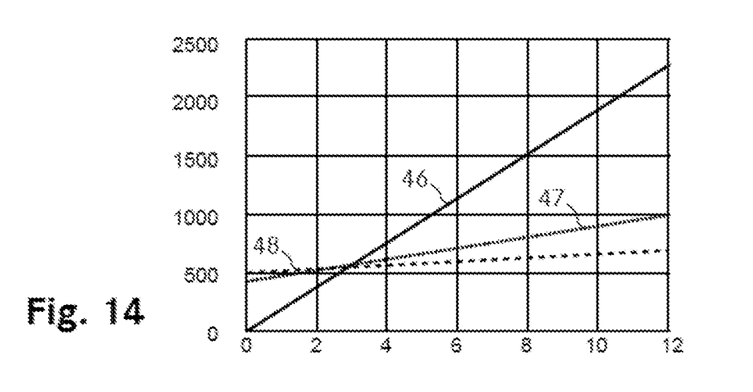

FIG. 14 shows the corresponding depictions of the input resistance of a Buck PFC but here it is connected to a three phase grid. The horizontal and vertical scales are the same as in FIG. 13.

Line 46 shows the input resistance for a standard control circuit, line 47 shows the input resistance for a control circuit according to the invention with a current conduction angle of $\pi/4$ and line 48 shows the input resistance for a control circuit according to the invention with a current conduction angle of $\pi/3$.

Again, line 46 of the input resistance of the standard PFC circuit behaves like an ohmic resistor and runs through the origin and lines 47 and 48 are offset by about the voltage levels of about 450 V and 500 V respectively. Also in this three phase configuration the resistance value is considerably reduced in the PFC circuit according to the invention.

It can be stated that the lower the input resistance of the PFC circuit is the higher is the damping of the LC circuit shown in FIGS. 11 and 12.

Figure 15:
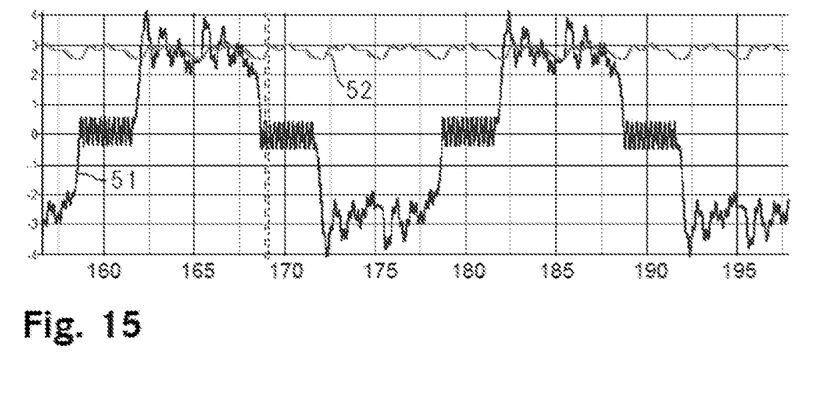
Figure 16:
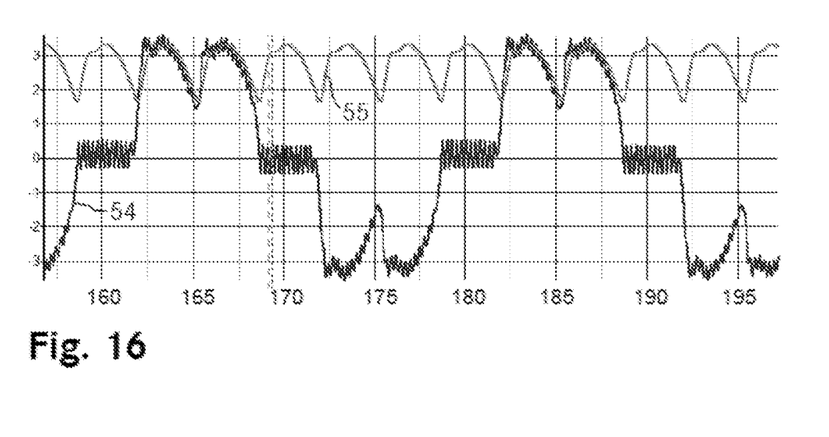
Figure 17:
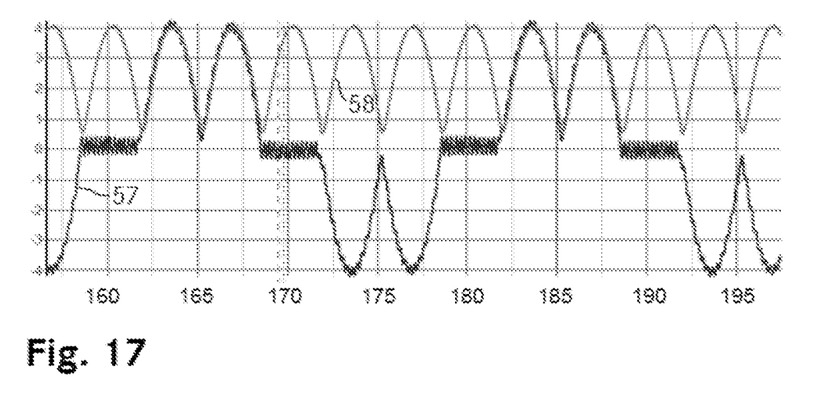

FIGS. 15 to 17 show the effect of this damping in different configurations. In the basic configuration for the simulations the grid includes three phase lines with a phase-to-phase voltage of 400 Vrms and a frequency of 50 Hz, is symmetrical and does not include a neutral line. The simulated input power is about 1500 W. The PFC circuit corresponds to the left part of the PFC circuit 10 shown in FIG. 2 where the grid inductivity per line (L1, L2, L2) is 2.5 mH (milliHenry), the X-caps (C1, CV2, C3) have a value of 680 nF (nanoFarad) and the capacitor C4 has a value of 4 µF (microFarad). The horizontal scale shows the time in ms and the vertical scale shows the current in A.

FIG. 15 shows a line current 51 for the standard PFC circuit, i. e. where the value $I_0$ is 0 A. Again, the standard PFC circuit can be seen as a pure resistive load with a resistance of about 195 Ohm. In this configuration, two resonance circuits exist. One of them includes twice the line inductivity L and a serial connection of two X-caps, resulting in a period of 260 µs (microSeconds) with a frequency of 3.85 kHz (kilohertz). The other includes twice the line inductivity L and the capacitor C4 behind the bridge rectifier, resulting in a period of 890 µs with a frequency of 1.12 kHz. None of these resonant circuits is damped in the case of the standard PFC circuit.

Further, the cumulative input current, i.e. the sum of the single current waveforms of all three phase lines, is shown as line 52.

FIG. 16 shows the line current 54 for a PFC circuit according to the invention with a current conduction angle of $\pi/4$, where the value $I_0$ is about −7.9 A and the resistance of the PFC circuit is about 51 Ohm.

As can be seen, the ringing of the first resonance circuit cannot be damped if the phase does not conduct current, such as for example during 3-phase operation because the load is NOT present. However, the ringing resulting from the second resonant circuit is damped to a certain extent. The current waveform approximates a sine with only a small ringing. This is due to the fact that it only takes place if the diodes of the bridge rectifier are conducting. Line 55 again shows the cumulative input current for all three phases.

FIG. 17 shows the line current 57 for a PFC circuit according to the invention with a current conduction angle of $\pi/3$, where the value $I_0$ is about −26.6 A and the resistance of the PFC circuit is about 18 Ohm.

Again, the ringing of the first resonance circuit is not damped if the phase does not conduct current. However, the ringing resulting from the second resonant circuit is efficiently damped in this case. The resulting cumulative input current that is shown as line 58 is almost a perfect rectified sine wave.

It has been found that the damping is influenced by the current conduction angle. The lower the angle, the higher the damping is.

It has further been found that the harmonics can be attenuated even better if the influence of the capacitor (C4) connected directly at the DC-side of the bridge rectifier is compensated by a slight phase shifting of the current reference signal. And moreover that the phase shift of the current waveform is only a function of the capacitor value.

In summary, it is to be noted that the invention enables to provide a method and a control circuit for generating a reference signal for a current regulator of a PFC circuit of a power supply unit where the current drawn from the grid has a reduced harmonic content and is therefore suited for a wide power range. Moreover, the invention enables to efficiently damp resonant circuits that result from the grid impedances in conjunction with capacitances of the PFC circuit.

The invention claimed is:

1. A method for generating a reference signal $I_{ref}$ for a current regulator of a PFC circuit of a power supply unit, wherein the reference signal $I_{ref}$ is generated as a sinusoidal signal $I_{ref}=\hat{I}*\sin(\bar{\omega}t)+I_0$, having a current magnitude $\hat{I}$ and an angular frequency $\bar{\omega}$ of an AC grid to which the power supply unit is connected, wherein $I_0$ is a current value generated in dependency of a sine of the current conduction angle $\varphi_0$, wherein, in order to achieve a same output power of the power supply unit using a standard reference signal $I_s=\hat{I}_s*\sin(\overline{\omega}t)$ having a standard current magnitude $\hat{I}_s$ and where the value $I_0=0$, the magnitude $\hat{I}$ of the reference signal $I_{ref}$ is generated by modifying the standard magnitude $\hat{I}_s$ in dependency of a change of the output power of the power supply unit due to adding the value $I_0$ to the reference signal $I_{ref}$, wherein the magnitude $\hat{I}$ of the reference signal $I_{ref}$ is generated by multiplying it with a factor $f_{ref}$, wherein the factor $f_{ref}$ is preferably determined as $$f_{ref} = \frac{2\cdot(\varphi_{s2}-\varphi_{s1})-\sin(2\cdot\varphi_{s2})+\sin(2\cdot\varphi_{s1})}{2\cdot(\varphi_2-\varphi_1)-\sin(2\cdot\varphi_2)+\sin(2\cdot\varphi_1)+4\cdot\sin(\varphi_0)\cdot\begin{bmatrix}\cos(\varphi_2)-\\\cos(\varphi_1)\end{bmatrix}}$$

wherein $\varphi_{s1}$ and $\varphi_{s2}$ are the power transfer angles when using the standard reference signal $I_s$ and wherein $\varphi_{i1}$ and $\varphi_{i2}$ are the power transfer angles of the power supply unit using the reference signal $I_{ref}$ such that a magnitude of a lower harmonic component of an input current of the power supply unit is increased and a magnitude of a higher harmonic component of the input current is decreased.

2. The method according to claim 1, wherein the reference signal is generated based on a voltage tapped either
 a) in front of a bridge rectifier of the PFC circuit
 b) behind the bridge rectifier of the PFC circuit or
 c) directly at an input of the power supply unit.

3. The method according to claim 1, wherein the current conduction angle $\varphi_0$ is chosen to be between 0 and $\pi/2$.

4. The method according to claim 1, wherein the reference signal $I_{ref}$ is set to zero if the reference signal $I_{ref}$ becomes negative.

5. The method according to claim 1, wherein the current conduction angle $\varphi_0$ is chosen such that the input current starts at zero.

6. The method according to claim 1, wherein a resulting resistance of the PFC circuit is used for damping a resonance circuit resulting from a grid impedance in conjunction with a capacitance of the power supply unit, wherein the capacitance is either
 a) an EMI capacitor present between two line conductors or between a line conductor and a neutral conductor of an input filter of the power supply or
 b) an capacitor arranged downstream of a bridge rectifier of the PFC circuit.

7. A control circuit for generating a reference signal $I_{ref}$ for a current regulator of a PFC circuit of a power supply unit, including a generator to generate the reference signal $I_{ref}$ as a sinusoidal signal $I_{ref}=\hat{I}*\sin(\overline{\omega}t)+I_0$, having a current magnitude $\hat{I}$ and an angular frequency $\overline{\omega}$ of an AC grid to which the power supply unit is connected, wherein the generator to generate the reference signal $I_{ref}$ is adapted to generate a constant current value $I_0$ in dependency of a sine of the current conduction angle $\varphi_0$ wherein, in order to achieve a same output power of the power supply unit using a standard reference signal $I_s=\hat{I}_s*\sin(\overline{\omega}t)$ having a standard current magnitude $\hat{I}_s$ and where the value $I_0=0$, the magnitude $\hat{I}$ of the reference signal $I_{ref}$ is generated by modifying the standard magnitude $\hat{I}_s$ in dependency of a change of the output power of the power supply unit due to adding the value $I_0$ to the reference signal $I_{ref}$, wherein the magnitude $\hat{I}$ of the reference signal $I_{ref}$ is generated by multiplying it with a factor $f_{ref}$, wherein the factor $f_{ref}$ is preferably determined as $$f_{ref} = \frac{2\cdot(\varphi_{s2}-\varphi_{s1})-\sin(2\cdot\varphi_{s2})+\sin(2\cdot\varphi_{s1})}{2\cdot(\varphi_2-\varphi_1)-\sin(2\cdot\varphi_2)+\sin(2\cdot\varphi_1)+4\cdot\sin(\varphi_0)\cdot[\cos(\varphi_2)-\cos(\varphi_1)]}$$

wherein $\varphi_{s1}$ and $\varphi_{s2}$ are the power transfer angles when using the standard reference signal $I_s$ and wherein $\varphi_{i1}$ and $\varphi_{i2}$ are the power transfer angles of the power supply unit using the reference signal $I_{ref}$ such that a magnitude of a lower harmonic component of an input current of the power supply unit is increased and a magnitude of a higher harmonic component of the input current is decreased.

8. The control circuit according to claim 7, adapted to generate the reference signal for a current regulator of a PFC circuit of a switch-mode power supply unit.

9. The control circuit according to claim 7, wherein the generator to generate the reference signal $I_{ref}$ is adapted to generate the current value $I_0$ as a negative value $I_0=-\hat{I}*\sin(\varphi_0)$.

10. The method according to claim 3, wherein the current value $I_0$ is generated as a negative value $I_0=-\hat{I}*\sin(\varphi_0)$.

11. The method according to claim 3, wherein the current conduction angle $\varphi_0$ is chosen to be between $\pi/5$ and $2\pi/5$.

* * * * *